United States Patent
Waterson et al.

(10) Patent No.: US 12,234,952 B2
(45) Date of Patent: Feb. 25, 2025

(54) POLYMERIC MATERIALS

(71) Applicant: INNOSPEC LIMITED, Ellesmere Port (GB)

(72) Inventors: Carl Waterson, Ellesmere Port (GB); Richard David Hayton, Ellesmere Port (GB); Ian Malcolm McRobbie, Ellesmere Port (GB)

(73) Assignee: INNOSPEC LIMITED, Ellesmere Port (GB)

( * ) Notice: Subject to any disclaimer, the term of this patent is extended or adjusted under 35 U.S.C. 154(b) by 727 days.

(21) Appl. No.: 17/428,104

(22) PCT Filed: Jan. 31, 2020

(86) PCT No.: PCT/GB2020/050235
§ 371 (c)(1),
(2) Date: Aug. 3, 2021

(87) PCT Pub. No.: WO2020/161474
PCT Pub. Date: Aug. 13, 2020

(65) Prior Publication Data
US 2022/0120385 A1    Apr. 21, 2022

(30) Foreign Application Priority Data
Feb. 4, 2019 (GB) .................................. 1901499

(51) Int. Cl.
*F17D 1/16* (2006.01)
*C08F 110/14* (2006.01)
(Continued)

(52) U.S. Cl.
CPC ............. *F17D 1/16* (2013.01); *C08F 110/14* (2013.01); *C08F 210/14* (2013.01); *C08J 5/18* (2013.01);
(Continued)

(58) Field of Classification Search
CPC ........ F17D 1/16; C08F 110/14; C08F 210/14; C08F 5/18; C08F 2323/20; C08F 2323/24; C08F 2423/20; C08F 2423/24
See application file for complete search history.

(56) References Cited

U.S. PATENT DOCUMENTS 3,933,263 A    1/1976  Frew et al.
4,008,347 A    2/1977  Amberg et al.
(Continued)

FOREIGN PATENT DOCUMENTS

CN        1500814 A       6/2004
CN        101886740 B    10/2012
(Continued)

OTHER PUBLICATIONS

GB Search Report for GB App No. GB1901499.2, mailed Jul. 29, 2019 (4 pages).
(Continued)

*Primary Examiner* — Michael C Miggins
(74) *Attorney, Agent, or Firm* — Shumaker, Loop & Kendrick, LLP (57) ABSTRACT

A combination comprising a receptacle of defined internal volume, which contains a chemical reaction product. The product may be made in apparatus for undertaking a chemical reaction which comprises an elongate housing and a receptacle. The elongate housing may include a cooling means and end fittings which may include ports where fluids may be introduced and/or removed.

20 Claims, 8 Drawing Sheets

(51) Int. Cl.
*C08F 210/14* (2006.01)
*C08J 5/18* (2006.01)

(52) U.S. Cl.
CPC ........ *C08J 2323/20* (2013.01); *C08J 2323/24* (2013.01); *C08J 2423/20* (2013.01); *C08J 2423/24* (2013.01)

(56) References Cited

U.S. PATENT DOCUMENTS

| | | | |
|---|---|---|---|
| 4,016,894 | A | 4/1977 | Baldwn et al. |
| 4,263,926 | A | 4/1981 | Drake et al. |
| 4,446,092 | A | 5/1984 | Bliley |
| 4,527,581 | A | 7/1985 | Motier |
| 5,002,203 | A | 3/1991 | Einer |
| 5,504,131 | A | 4/1996 | Smith et al. |
| 5,504,132 | A | 4/1996 | Smith et al. |
| 6,237,809 | B1 | 5/2001 | Kawai et al. |
| 6,398,059 | B1 | 6/2002 | Hayashi et al. |
| 6,649,670 | B1 | 11/2003 | Harris et al. |
| 6,858,188 | B2 | 2/2005 | Baxter, Jr. et al. |
| 6,906,150 | B2 | 6/2005 | Kimmareddi et al. |
| 7,119,132 | B2 | 10/2006 | Harris |
| 7,534,403 | B2 | 5/2009 | Eaton et al. |
| 7,582,708 | B2 | 9/2009 | Eaton et al. |
| 8,105,547 | B2 | 1/2012 | Eaton et al. |
| 8,110,150 | B2 | 2/2012 | Eaton et al. |
| 9,340,763 | B2 | 5/2016 | Damren et al. |
| 10,836,848 | B2 | 11/2020 | Paley et al. |
| 11,813,602 | B2 | 11/2023 | Waterson et al. |
| 2002/0065202 | A1 | 5/2002 | Eaton et al. |
| 2004/0167297 | A1 | 8/2004 | Kommareddi et al. |
| 2005/0239198 | A1 | 10/2005 | Kunas et al. |
| 2006/0293196 | A1 | 12/2006 | Harris et al. |
| 2008/0014395 | A1 | 1/2008 | Kitahara |
| 2014/0051610 | A1 | 2/2014 | Perry et al. |
| 2014/0151321 | A1 | 6/2014 | Chang et al. |
| 2017/0189837 | A1 | 7/2017 | Herold et al. |
| 2018/0119084 | A1 | 5/2018 | Tuohey et al. |
| 2019/0015799 | A1 | 1/2019 | Gebauer et al. |

FOREIGN PATENT DOCUMENTS

| | | |
|---|---|---|
| CN | 102731695 A | 10/2012 |
| CN | 103300646 A | 9/2013 |
| CN | 107266632 A | 10/2017 |
| CN | 108463617 A | 8/2018 |
| EP | 1335941 B1 | 12/2005 |
| EP | 1876962 A2 | 1/2008 |
| JP | 2000141478 A | 5/2000 |
| RU | 2125577 C1 | 1/1999 |
| RU | 2232165 C2 | 7/2004 |
| RU | 2648079 C1 | 3/2018 |
| WO | 9932281 A1 | 7/1999 |
| WO | 99/60038 A1 | 11/1999 |
| WO | 02/34802 A1 | 5/2002 |
| WO | 2009055112 A1 | 4/2009 |
| WO | 2010080317 A1 | 7/2010 |
| WO | 2013/106809 A1 | 7/2013 |
| WO | 2015/039034 A1 | 3/2015 |
| WO | 2016053956 A1 | 4/2016 |
| WO | 2016/169803 A1 | 10/2016 |
| WO | 2017/118643 A1 | 7/2017 |
| WO | 2018027020 A1 | 2/2018 |
| WO | 2018217122 A1 | 11/2018 |
| WO | 2019245889 A1 | 12/2019 |
| WO | 2020079148 A1 | 4/2020 |

OTHER PUBLICATIONS

GB Search Report for GB App No. GB1901494.3, mailed Jul. 31, 2019 (5 pages).
GB Search Report for GB App No. GB1901496.8, mailed Aug. 1, 2019 (3 pages).
GB Search Report for GB App. No. GB1901503.1, mailed Aug. 1, 2019 (3 pages).
GB Search Report for GB App No. GB2001370.2, mailed Jun. 24, 2020 (5 pages).
GB Search Report for GB App. No. GB2001371.0, mailed Jul. 20, 2020 (4 pages).
GB Search Report for GB App No. GB2001376.9, mailed Jul. 20, 2020 (4 pages).
GB Search Report for GB App No. GB2001374.4, mailed Jul. 30, 2020 (5 pages).
International Search Report (ISR) for PCT/GB2020/050233 mailed Apr. 9, 2020 (5 pages).
Written Opinion for PCT/GB2020/050233 mailed Apr. 9, 2020 (4 pages).
International Search Report (ISR) for PCT GB2020/050236 mailed Mar. 23, 2020 (3 pages).
Written Opinion for PCT GB2020/050236 mailed Mar. 23, 2020 (5 pages).
International Search Report (ISR) for PCT GB2020/050234 mailed May 18, 2020 (5 pages).
Written Opinion for PCT GB2020/050234 mailed May 18, 2020 (5 pages).
International Search Report (ISR) for PCT GB2020/050235 mailed Apr. 9, 2020 (3 pages).
Written Opinion for PCT GB2020/050235 mailed Apr. 9, 2020 (6 pages).
Notice of Allowance issued for U.S. Appl. No. 17/428,103 mailed Jul. 14, 2023 (10 pages).
Final Rejection issued for U.S. Appln. No. 17/428,100, mailed Aug. 15, 2023 (14 pages).
Non-Final Office Action i(NFOA) ssued for U.S. Appl. No. 18/374,332 mailed May 23, 2024 (17 pages).
Non-Final Office Action (NFOA) issued for U.S. Appl. No. 17/428,096 mailed Apr. 25, 2024 (22 pages).
Non-Final Office Action (NFOA) issued for U.S. Appl. No. 17/428,100 mailed Mar. 16, 2023 (17 pages).
Non-Final Office Action (NFOA) issued for U.S. Appl. No. 17/428,103 mailed Mar. 9, 2023 (12 pages).
Notice of Allowance issued for U.S. Appl. No. 17/428,100 mailed Dec. 15, 2023 (8 pages).
Final Rejection issued for U.S. Appl. No. 17/428,096, mailed Aug. 29, 2024 (12 pages).

POLYMERIC MATERIALS

TECHNICAL FIELD AND BACKGROUND

This invention relates to polymeric materials and particularly, although not exclusively, relates to drag reducing polymers. Preferred embodiments relate to drag reducing polymers to reduce the effect of friction ("drag") experienced by a liquid hydrocarbon flowing through a hydrocarbon transportation pipeline.

The use of polymers and/or copolymers of alpha-olefins to reduce the effect of friction ("drag") experienced by a liquid hydrocarbon flowing through a hydrocarbon transportation pipeline is well-known in the art. Reduction of the drag decreases the amount of energy needed to accomplish such flow, and therefore also decreases the costs associated with pumping. These materials, often called drag reducing agents (DRAs), can take various forms, including certain polymers in oil soluble suspensions, emulsions, pellets, gels, microfine powders and particulate slurries, for example comprising aqueous, organic or mixed aqueous/organic solvents. In some cases, the DRA may comprise a 'true' solution in an appropriate carrier solvent (e.g. dilute polymer solution product, produced in a solution polymerisation process). However, particulate slurries that comprise ground polymers are often the least expensive form.

The polymers that are most commonly used in preparing DRAs are poly(alpha-olefins) of carbon chain lengths ranging from 2 to about 40. Typically these polymers are prepared using Ziegler-Natta catalysts and frequently also co-catalysts such as alkyl aluminium compounds. These polymerization reactions tend to be very efficient, producing relatively high yield when carried out in bulk. However, they also tend to be highly exothermic. The exotherm itself creates problems which reduce the usefulness of the product if the exotherm is not effectively managed. These problems include, but are not necessarily limited to, a substantial reduction in the polymer molecular weight. This can substantially reduce the efficacy of the polymer in a drag reducing agent formulation.

Various different types of apparatus have been described for producing polymers and/or copolymers of alpha-olefins as described below.

U.S. Pat. Nos. 5,504,132 and 5,504,131 describe the preparation and use of non-crystalline high molecular weight hydrocarbon soluble drag reducing polymers. The documents describe suitable polymerization reaction vessels as being polymeric bottles and bags. It is stated the invention there described has been demonstrated with bottles and bags containing five to seven layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene or polybutylene. Use of polyethylene terephthlate as an additional layer to add reactor strength at high temperatures is stated to be most preferred. One disadvantage of use of the bottle and bag described is that the produced poly(alpha-olefin) polymer is extremely adherent to the walls of the reactor vessels. As a result, the polymeric vessels cannot be separated from the poly(alpha-olefin) polymer. Instead, the bottles or bags are ground together with the polymer in forming the drag reducing material. This is, however, disadvantageous and undesirable—the material of the bottles or bag may contaminate downstream processes or products, for example within oil refineries. When contamination reaches the refined fuel, adverse effects such as filter blockages may occur in the end fuel application.

U.S. Pat. Nos. 7,534,403, 7,582,708, 8,105,547 and 8,110,150 describe polymerization reactors for creating drag-reducing polymers. The reactors are said to address the problem of removal of heat from the DRA polymerization reactor without the addition of cooling additives. The solution to the problem involves use of a reactor which includes a reservoir which incorporates an array of plates which define a heat exchanger. In one embodiment, seventeen, 4 feet heat exchanger plates are spaced apart by $4^{13}/_{16}$ inches. Disadvantageously, it is difficult using the apparatus to achieve consistent product quality, due to the dimensions and it may be difficult to separate the polymer from the heat exchanger plates.

U.S. Pat. No. 6,649,670B describes continuous polymerization and ambient grinding methods for polyolefin drag reducing agents. In one embodiment, there is described a continuous polymerization method which involves a "form, fill and seal" packaging process. Polymerization apparatus may comprise a continuous stirred tank reactor (CSTR) where raw materials (e.g. monomers. and catalysts) are continuously charged, allowed an appropriate dwell or residence time in the reactor system, such that adequate molecular weight or viscosity is sustained and, subsequently, discharged in a continuous fashion to a "form, fill and seal" packaging device. The packaging device may form bags which serve as temporary and isolated reactor vessels which are collected, kept in the presence of an inert atmosphere and reactants allowed to polymerise to high conversion.

U.S. Pat. No. 6,906,150 discloses a method of preparing polymers which are drag reducing agents. The method comprises allowing a polymerization mixture to polymerize in at least one closed reaction chamber configured as a linear void space with a linear axis and a cross-section and first and second ends, where the linear void space is surrounded by a chamber wall having an inner chamber surface and an outer heat exchange surface. Coolant is passed over the outer heat exchange surface to remove heat therefrom. The ends of the reaction chamber are opened and essentially all of the polymer is removed from each reaction chamber with a harvesting plunger. The harvesting plunger travels along the linear axis of the void space from the first end to the second end thereof. However, use of harvesting plungers is impractical as apparatus comprising such plungers is expensive to manufacture, the plungers are not very effective for removing the solid polymer from the reaction chambers and, furthermore, cleaning of the apparatus ready for recharging of the reaction chambers is time-consuming and difficult.

Any process for producing drag reducing polymers aims to produce polymers in a high yield and in high amounts (e.g., if produced in a batch process) which have high effectiveness in drag reduction and which are produced in an efficient manner, in a simple, cost-effective apparatus and in a form convenient for manipulation and use.

SUMMARY

It is an object of the present invention to address the above described problems.

According to a first aspect of the invention, there is provided a combination comprising an elongate receptacle containing a drag reducing polymer, wherein the receptacle defines an internal volume which contains said polymer, wherein said internal volume is in the range 10000 $cm^3$ to 150000 $cm^3$.

The combination described can be produced easily in the apparatus hereinafter described. It can be produced in relatively large amounts in a batch process and the combination of elongate receptacle containing said drag reducing polymer can be readily manipulated and/or handled, for example by a single human operative. The polymer itself can readily be isolated from the receptacle and subjected to downstream processes for production of a formulation comprising the drag reducing polymer for use in drag reduction.

Said receptacle is preferably not self-supporting. It is preferably flaccid when not containing polymer and/or unless inflated or otherwise supported by external means as described herein.

Said receptacle preferably comprises a plastic material, for example a plastic film material which has been arranged to define said receptacle. Said film material may have a thickness of at least 20 μm, suitably at least 50 μm, preferably at least 100 μm. The thickness of the film material may be less than 2000 μm, preferably less than 1000 μm, more preferably less than 500 μm.

The internal wall area of the receptacle may be defined as the area of the receptacle which contains said polymer. Suitably, at least 50%, preferably at least 75%, more preferably at least 90%, especially about 100% of the internal wall area is defined by a said plastic film material having a thickness in the range defined. The thickness of the film material may be between 20 μm and 1000 μm, preferably between 50 μm and 500 μm.

The internal wall area of the receptacle as described is preferably defined by a plastic film material which consists of a single layer. Thus, the receptacle preferably does not comprise a laminate and/or a multi-ply material. Said internal wall area of the receptacle preferably has a substantially smooth surface.

An external wall area of the receptacle, being the wall area of the receptacle on an opposite side of the film material to that of the internal wall area, preferably has a substantially smooth surface as described for that of the internal wall area. Said internal wall area and said external wall area preferably consist of identical materials and, preferably, represent opposing surfaces of the same material.

Preferably, substantially the entirety of said receptacle comprises said plastic material, more preferably said plastic film material as described.

As described, said receptacle preferably comprises a plastic material, for example a plastic film material. Suitably, at least 90 wt %, preferably at least 95 wt %, more preferably 100 wt % of said receptacle is made up of said plastic material.

Said plastic material is suitably sufficiently strong and inert to withstand the polymerisation reaction and not to adhere significantly to the polymer as it is forming. It is also preferably relatively cheap, so it can be discarded after use. Said plastic material is preferably heat sealable. It is preferably a thermoplastic polymer. It is preferably chemically compatible with the reagents used and polymer produced in the polymerisation reaction. Said plastic material preferably comprises optionally-substituted, preferably unsubstituted, alkylene (eg ethylene) repeat units which may be components of a homopolymer or copolymer. Said plastic material preferably comprises an optionally-substituted, preferably unsubstituted, polyolefin polymer, such as a polyalkylene polymer, for example polyethylene.

Said receptacle preferably includes a first end and a second end which are spaced apart along the elongate extent of the receptacle. Said first end is preferably a closed end and, more preferably, is substantially permanently closed— i.e. it is preferably not openable, except by, for example, destruction of the receptacle. Said first end preferably includes a sealed, for example a heat sealed region, suitably whereby opposing walls of the receptacle have been secured together, for example heat bonded together, thereby to define the closed end. The length of the receptacle is suitably the linear distance between said first end and said second end.

In the context of the present specification and unless the context otherwise requires, the diameter of the elongate receptacle refers to the longest straight line passing from one side of the cross-section of the receptacle to an opposite side, when the receptacle is in a distended state and/or when it is configured to define its maximum cross-sectional area.

In the context of an elongate receptacle having a substantially symmetrical cross-sectional shape (eg having a substantially circular cross-section), the diameter of the elongate receptacle refers to a straight line passing from one side to an opposite side of the receptacle, through the centre of the cross-section, when the receptacle is in a distended state and/or when it is configured to define its maximum cross-sectional area.

Preferably, the diameter of the receptacle is substantially constant for at least 80% (preferably at least 90% or 95%) of the distance from the first end towards said second end. In a preferred embodiment, a region (eg a mouth) of the receptacle adjacent said second end diverges (or is suitably splayed) so an opening of the receptacle at said second end has a greater diameter than a region of the receptacle inwards of the second end. Such an arrangement facilitates securement and sealing of the second end in position in an apparatus in which the polymer may be produced in a way which minimises creation of air gaps in use.

Said second end is preferably not heat sealed to restrict access to the receptacle at said second end. Said second end is preferably not provided with any permanent closure. Said second end may be left open, suitably thereby maintaining access to the polymer within the elongate receptacle or may include a releasable closure, for example a bag tie or the like. Any such closure need not (and therefore may not) sealingly close the second end. Thus, said second end may not be sealingly closed and/or may not be arranged to prevent passage of a gas (for example ambient air) into the receptacle via said second end.

The diameter of the internal volume of the receptacle may be in the range 5 cm to 15 cm across its entire extent. When the second end diverges as described, the maximum diameter of the divergent region may be up to 30% greater than the diameter of the receptacle upstream of the divergent region. The length of the internal volume of the receptacle may be in the range 1 m to 20 m. The internal volume of the receptacle may be in the range 10000 $cm^3$ to 0.15 $m^3$. Preferably, said diameter of the receptacle (suitably across at least 80% of the length of the receptacle) is less than 11 cm. It may be at least 7 cm (suitably across at least 80% of the length of the receptacle). Said length of the receptacle is preferably in the range 3 m to 15 m, especially in the range 4 m to 11 m. Said internal volume of the receptacle is preferably in the range 20000 $cm^3$ to 0.1 $m^3$, more preferably in the range 20000 $cm^3$ to 60000 $cm^3$. The diameter, length and/or volume are suitably selected as described to optimise the polymerisation process and/or curing of polymer within the receptacle and/or allow the receptacle to be readily manipulated and/or handled, for example by a single human operative. It is found that if the diameter, length and/or volume are too great, there may be insufficient heat transfer during the polymerisation. This may mean that the degree of polymerisation across the diameter and/or within the volume may be unacceptably variable which may result in production of an inferior drag reducing polymer.

Preferably, other than any means by which the first end is arranged to define the closed end, the receptacle includes no seams between said first and second ends. Said receptacle is preferably formed from lay-flat tubing. It is preferably sealed at said first end as described and is divergent (e.g. by being splayed) at said second end.

The aspect ratio of the elongate receptacle may be defined as the length of the internal volume of the receptacle divided by the diameter of the internal volume of the receptacle. Said aspect ratio may be at least 10, suitably at least 20, preferably at least 30. Said aspect ratio may be less than 600, preferably less than 300, more preferably less than 150. Said aspect ratio is preferably between 10 and 300, more preferably between 30 and 150.

The weight of drag reducer polymer in said receptacle may be at least 8 kg and is preferably at least 15 kg. The total weight may be less than 125 kg, suitably less than 85 kg. The weight of drag reducer polymer in said receptacle may be between 8 kg and 125 kg, preferably between 15 kg and 85 kg.

The drag reducing polymer may be any conventional or known polymeric drag reducing agent (DRA) including, but not limited to, poly(alpha-olefin), polychloroprene, vinyl acetate polymers and copolymers, poly(alkylene oxide) (PAO), and mixtures thereof and the like. In one embodiment, the monomer may be any monomer which, when polymerized, forms a polymer suitable for use as a drag reducing agent (DRA). Said at least one monomer may comprise an alpha-olefin. Preferred alpha-olefins may have a carbon chain length in the range 2 to 40 carbon atoms, preferably 4 to 25, more preferably 6 to 12 carbon atoms. Said at least one monomer may be selected from the group comprising: 1-hexene, 1-heptene, 1-nonene, 1-octene, 1-decene, 1-dodecene, 1-tetradecene, isobutylene; alkyl acrylates; alkylmethacrylates; styrene and alkyl styrene. Copolymers (which may include two or more dissimilar monomers) of these monomers may also make suitable drag reducing agents. Preferred monomers include alpha-olefins with a carbon chain length in the range 4 to 25, more preferably 6 to 12 carbon atoms. Preferred monomers are selected from the group comprising: 1-hexene, 1-heptene, 1-nonene, 1-octene, 1-decene, 1-dodecene, 1-tetradecene, isobutylene. An especially preferred monomer is 1-decene.

Preferred copolymer drag reducing agents may comprise repeat units derived from 1-decene, optionally (but preferably) in combination with repeat units from one or more further monomers. Such further monomers may be selected from 1-hexene, 1-octene and 1-dodecene, for example in a molar ratio of 1:9 to 9:1. An especially preferred copolymer drag reducing agent may be prepared from a monomer mixture comprising 1-hexene and 1-decene.

Any known suitable catalyst and/or co-catalyst may be used in preparing the drag reducing polymer as long as they sufficiently catalyse the reaction to a sufficient extent. Metallocenes are useful catalysts for polymerizing some monomers. In the case of alpha-olefins, polymerization may be conducted by the inclusion of a mixture of Ziegler-Natta catalyst and co-catalyst(s) into the monomer. Catalysts for the polymerization of alpha-olefins include, but are not necessarily limited to, powdered catalyst $TiCl_3.AA$ (aluminum activated titanium trichloride); co-catalyst(s), diethylaluminum chloride (DEAC), and diethylaluminum ethoxide (DEALE); TEAL (triethyl aluminum chloride), tri-methyl aluminum, tri-isobutyl aluminum, MAO (methylaluminoxane), haloalkanes (e.g. 1, 2-dichlorethane) and the like.

Of course, it will be necessary to match the co-catalyst with the main catalyst, so that the catalytic activity of the main catalyst is triggered only by the presence of a particular co-catalyst or class thereof.

The sum of the wt % of said elongate receptacle and said drag reducing polymer in said combination of the first aspect is suitably at least 90%, preferably at least 95 wt %, more preferably at least 98 or 99 wt %. Said combination of the first aspect may comprise said elongate receptacle, said drag reducing polymer, unreacted monomer and catalyst(s) and suitably the sum of the wt % of said elongate receptacle, said drag reducing polymer, unreacted monomer and catalyst(s) in said combination of the first aspect is at least 90%, preferably a least 95 wt %, more preferably at least 98 wt %, at least 99 wt %.

In one embodiment, said combination of the first aspect may have an internal volume in range 20000 $cm^3$ to 100000 $cm^3$, wherein a plastic film material has been arranged to define said receptacle, said film having a thickness of 50 to 500 μm, wherein the aspect ratio of the receptacle, defined as the length of the internal volume of the receptacle divided by the diameter of the internal volume of the receptacle, is in the range 30 to 120.

In another embodiment, said combination of the first aspect may have an internal volume in range 20000 $cm^3$ to 60000 $cm^3$, wherein a plastic film material has been arranged to define said receptacle, said film having a thickness of 125 to 500 μm, wherein the aspect ratio of the receptacle, defined as the length of the internal volume of the receptacle divided by the diameter of the internal volume of the receptacle, is in the range 30 to 80 and wherein said receptacle consists of a single layer, polyalkylene film.

In a second aspect, the invention provides provided a combination comprising an elongate receptacle containing a drag reducing polymer, wherein the receptacle contains at least 8 kg of said drag reducing polymer. Said receptacle may contain at least 15 kg of said polymer. The total weight of polymer in said receptacle may be less than 125 kg, suitably less than 85 kg. Said combination preferably includes 8 kg to 125 kg, more preferably 15 kg to 85 kg of polymer in said receptacle. The combination of the second aspect may include a receptacle having any feature of the receptacle of the first aspect. The combination of the second aspect may include a drag reducing polymer having any feature of the drag reducing polymer of the first aspect.

Said elongate receptacle may be removed from the combination of the first and/or second aspect to isolate the polymer from the elongate receptacle. In a third aspect, the invention provides a method of isolating a drag reducing polymer from the combination of the first and/or second aspect, the method comprising a step of removing polymer from said receptacle. Said method may comprise disengaging, for example, peeling the film of the receptacle away from the polymer. Advantageously, this may be achieved without leaving any film derived from the receptacle on the polymer. Thus, in a preferred embodiment, at least 95 wt %, preferably at least 99 wt %, more preferably 100 wt % of the film of the receptacle is disengaged from the polymer. Thus, the polymer may be isolated from the receptacle and, therefore, preferably includes less than 1 wt %, more preferably less than 0.1 wt %, especially substantially 0 wt % of film derived from said receptacle.

According to a fourth aspect of the invention, there is provided a solid mass of drag reducing polymer, suitably isolated from a receptacle in which it may be made, wherein the solid mass is substantially elongate and has a volume in the range 10000 cm³ to 150000 cm³ and/or a weight in the range 8 kg to 125 kg.

The diameter of the solid mass of drag reducing polymer may be in the range 5 cm to 15 cm across its entire extent. The length of the solid mass of drag reducing polymer may be in the range 1 m to 20 m. The volume of the solid mass of drag reducing polymer may be up to 0.15 m³. Preferably, said diameter of the solid mass of drag reducing polymer (suitably across at least 80% of the length of the solid mass of drag reducing polymer) is less than 11 cm. Said diameter of said solid mass of drag reducing polymer (suitably across at least 80% of the length of the receptacle) may be at least 7 cm. Said length of the solid mass of drag reducing polymer is preferably in the range 3 m to 15 m, especially in the range 4 m to 11 m. Said volume of said solid mass of drag reducing polymer may be up to 0.15 m³. It is preferably in the range 20000 cm³ to 0.1 m³, more preferably in the range 20000 cm³ to 60000 cm³.

The aspect ratio of the solid mass of drag reducing polymer may be defined as the maximum length of the solid mass of drag reducing polymer divided by the maximum diameter of the solid mass of drag reducing polymer. Said aspect ratio may be at least 10, suitably at least 20, preferably at least 30. Said aspect ratio may be less than 600, preferably less than 300, more preferably less than 150. Said aspect ratio is preferably between 10 and 300, more preferably between 30 and 150.

The weight of said solid mass of drag reducing polymer is preferably at least 8 kg and is more preferably at least 15 kg and, especially, is at least 30 kg. The weight may be less than 125 kg, suitably less than 85 kg. Said solid mass of drag reducing polymer preferably has a weight in the range 8 kg to 125 kg, more preferably 15 kg to 85 kg. Said weight may be in the range 15 kg to 125 kg or 30 kg to 85 kg.

The drag reducing polymer may be as described in any statement herein.

Any feature of any aspect of any invention or embodiment described herein may be combined with any feature of any aspect of any other invention described herein mutatis mutandis.

BRIEF DESCRIPTION OF THE DRAWINGS

Specific embodiments of the invention will now be described, by way of example, with reference to the accompanying drawings in which.

DETAILED DESCRIPTION

In the Figures, the same or similar parts are annotated with the same reference numerals.

Figure 1:
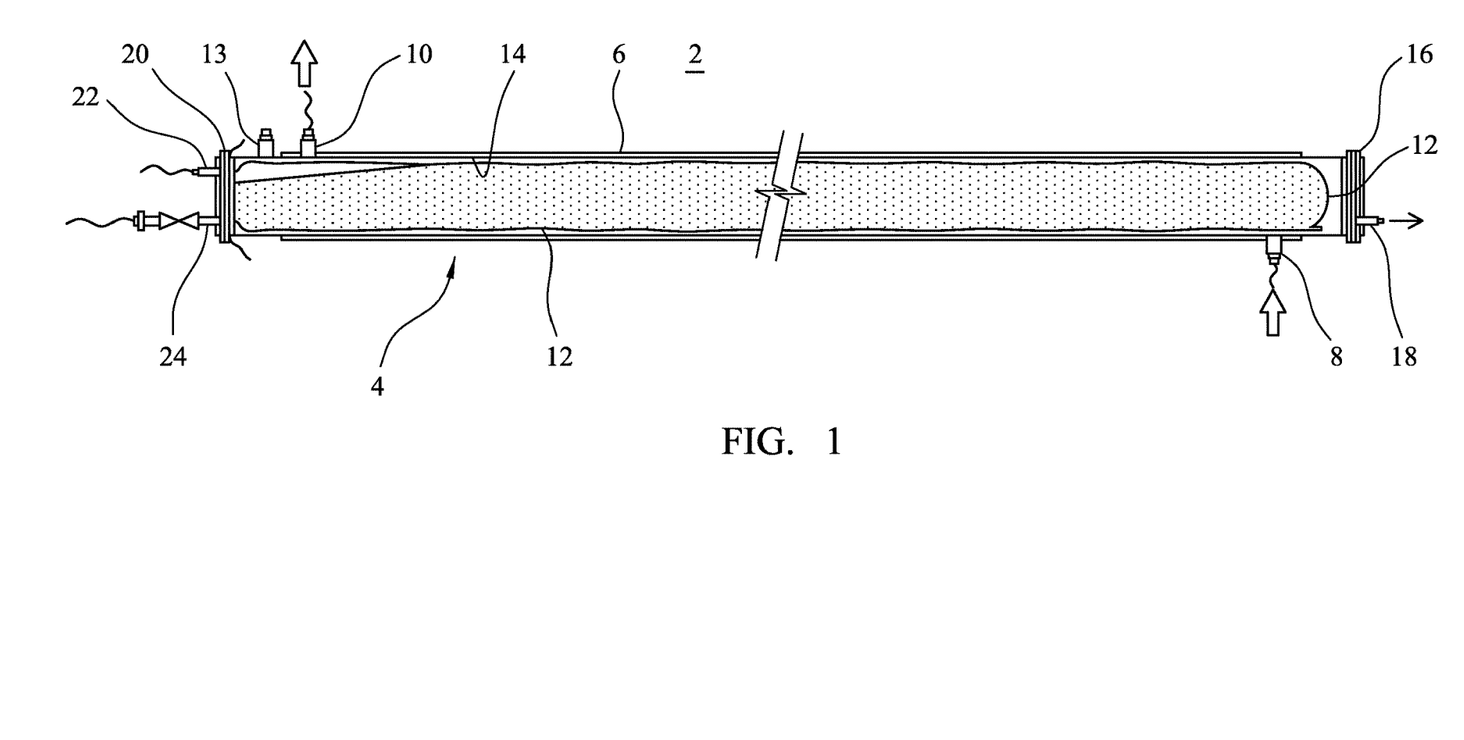
FIG. 1 is a schematic representation of apparatus for producing a polymer

Referring to FIG. 1, apparatus 2 for carrying out a polymerisation reaction to produce, for example, a DRA involving monomer(s) and catalyst comprises a rigid elongate support tube assembly 4 which includes a coolant containing cooling jacket 6. The jacket 6 includes a coolant inlet 8 and a coolant outlet 10. Within the supporting tube assembly 4 is arranged an inflatable plastic reaction tube 12 (shown in a substantially filled state in FIG. 1) which abuts an internal wall 14 of the support tube assembly 4. End fitting 16 at one end of support tube assembly 4 includes a fluid port 18 via which an inert gas may exit the apparatus. End fitting 20 at an opposite end of support tube assembly 4 includes fluid ports 22, 24 in which fluids (e.g. monomer(s) and/or catalyst(s) and/or inert gas) may be introduced and/or removed from the apparatus during operation. In use of the apparatus, polymer is produced within the plastic reaction tube 12 while the tube 12 is cooled by contact with internal wall 14 of support assembly 4 which is cooled by coolant passing within cooling jacket 6 and while a positive pressure of inert gas is maintained around the tube 12. The contents of the plastic reaction tube may be maintained under inert gas conditions, through the application of inert gas via ports 22 and/or 24 while the polymerisation process is carried out. After completion of the polymerisation, end fitting 20 is removed and the plastic reaction tube 12 containing polymer produced is withdrawn from the assembly 4. The reaction tube 12 (i.e. the plastic material of which it consists) is disengagaed, for example peeled, from the polymer to isolate the polymer from the reaction tube. The polymer may then be comminuted and formulated for use as a drag reducing additive.

Features of the apparatus and associated processes are described in greater detail below.

Figures 2A, 2B, 2C:
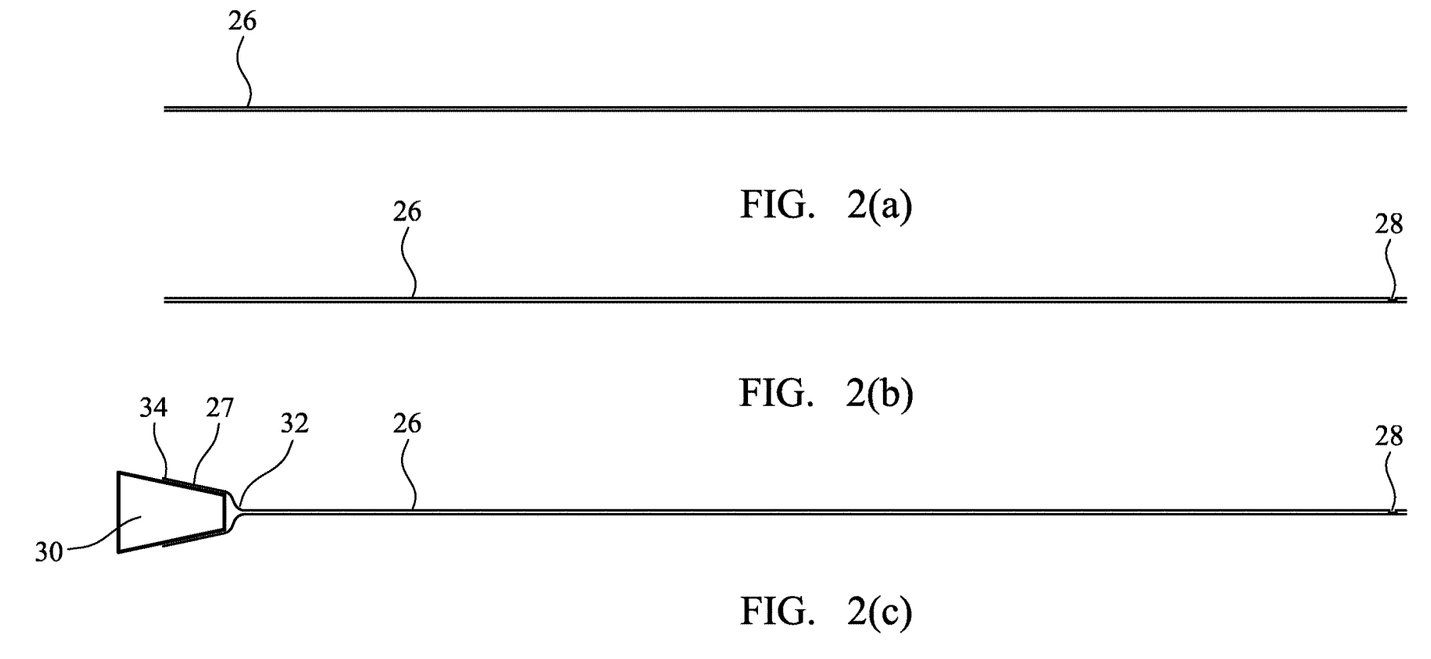
FIGS. 2(a) to 2(d) illustrate, in schematic cross-section, steps involved in producing a plastic reaction tube of the apparatus.
Figure 2D:
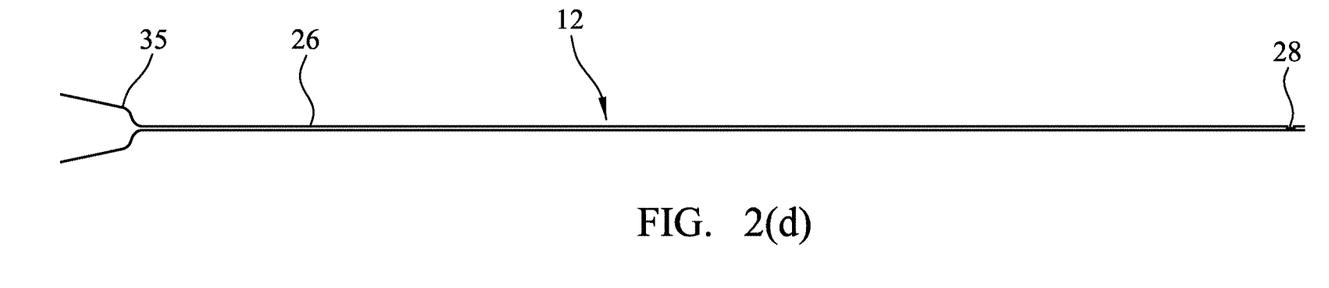

FIGS. 2(a) to (d) illustrate steps involved in producing the inflatable plastic reaction tube 12 which, in its finished state, is as represented in FIG. 2(d).

The reaction tube 12 is formed from 125 μm (500 gauge) lay flat, polyethylene tube 26 which is initially not closed at either end The tube has a length of about 600 cm plus an additional 5 cm to 10 cm (to enable it to be clamped in position as described hereinafter) and a width of about 153 mm±5 mm when in its flattened state shown in FIG. 2(a).

In a first step, shown in FIG. 2(b), one end of the tube is heat sealed as represented by number 28, thereby to fully close off the end and define one closed end of a receptacle for a polymerisable mixture.

In a second step, shown in FIG. 2(c), open end of the tube 26 (opposite the closed end) is stretched (as illustrated by reference numeral 27) over a heated cone 30 thereby to splay the tube in a region thereof towards its open end. As a result, the diameter of the tube 26 adjacent its open end gradually increases on moving from region 32, inwards of the open end, to region 34, situated at said open end.

In a third step, shown in FIG. 2(d), the cone 30 and tube 26 are disengaged thereby to leave splayed open end 35 which has been permanently deformed by the heat treatment using the heated cone 30.

The open end is splayed as aforesaid to facilitate securement of the open end within the apparatus in such a way as to minimise air gaps between the plastic reaction tube 12 and associated fittings of the apparatus. If air was to become trapped within folds of the plastic reaction tube 12, such air could be detrimental to the polymerisation process and/or reagents used therein. In addition, the splaying facilitates production of a fluid-tight seal between the plastic tube and fittings of the apparatus.

The apparatus 2 may be assembled as described with reference to FIGS. 3(a) to 3(d).

Figure 3A:
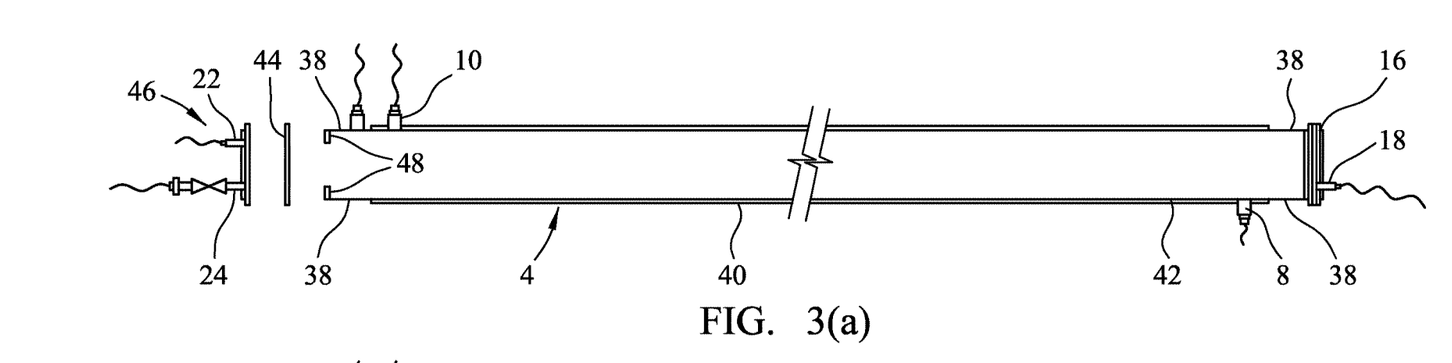
FIGS. 3(a) to 3(d) illustrate steps involved in assembling the apparatus, including the plastic reaction tube.

Referring to FIG. 3(a), support tube assembly 4 includes an inner rigid tube 38 arranged within an outer rigid tube 40. Spacers (not shown) are provided between tubes 38, 40 to maintain spacing therebetween thereby to define a passageway 42 between the tubes 38, 40 in which cooling fluid can flow. Ends of the outer rigid tube are welded to the outer surface of the inner rigid tube, to close the ends of the jacket assembly. Coolant inlet 8 communicates with the passageway 42 for passage of cooling fluid from the outside into the passageway 42 via the inlet 8 and out thereof via outlet 10. The cooling fluid can flow within the passageway around substantially the entirety of tube 38, before it exits the passageway via coolant outlet 10. Thus, a cooled, jacketed support tube assembly is arranged around the plastic reaction tube 12.

Inner tube 38 may suitably be made from stainless steel (e.g. SS304L) of thickness 0.083" (2.1 mm) and may have an outer diameter of 4" (101.6 mm). The length may be 20 ft (609.6 cm). An inlet 13 (FIG. 1) is provided for introduction of gas into the inside of the inner tube 38 as described below.

Outer tube 40 may suitably be made from stainless steel (e.g. SS304L) of thickness 0.12" (3 mm) and may have an inner diameter of 108 mm and an outer diameter of 4.5" (114.3 mm). The length may be 19 ft 7½" (598.2 cm).

Coolant inlet 8 and outlet 10 may be fabricated with a 0.5" NPT Weldolet (Trade Mark). A push fit adaptor may be used to allow easy connection or removal of tubing for coolant.

End fitting 16 may comprise a suitable gasket and a sanitary stainless steel end plate with a single tapped thread for the port 18.

At the left hand end of FIG. 3(a), there is shown a 4" (101.6 mm) Viton (Trade Mark) tri-clamp gasket 44 and an end plate 46. The end plate 46 incorporates inlets/outlets 22, 24 which may be tapped into the end plate. A push fit adaptor may be provided allowing convenient connection and removal of polyethylene (PE) tubing. Inlet/outlet 24 incorporates a ½" NPT ball valve. As described hereinafter, during the process described inlet/outlet 24 is used in three different steps—(a) inflation and inert gas flushing of the reaction tube 12; (b) charging of monomer/catalyst mixture; and (c) flushing with inert gas after charging with the monomer/catalyst mixture (to clear delivery lines and provide additional insertion of the apparatus contents).

Also as described hereinafter, during the process described inlet/outlet 22 may be used as an inert gas outlet during inflation of reaction tube 12, inerting and monomer/catalyst charging; and subsequently as an inlet for inert gas (to maintain a small positive pressure inside the reaction tube 12 for the remainder of the bulk polymerisation process).

Although in the figures the apparatus is shown with the elongate axes of tubes 38, 40 of the support tube assembly 4 horizontal, it is preferred that the tubes are raised at the left hand end of FIGS. 3(a) to (d) to facilitate flow of fluids from their position of introduction and into the reaction tube 12 defined by tube 26; and to avoid loss of monomer/catalyst via port 22 during charging. Typically the angle defined by tubes 38, 40 to the horizontal is about 2 to 3° (or the gradient is about 1 in 20).

Figure 3B:
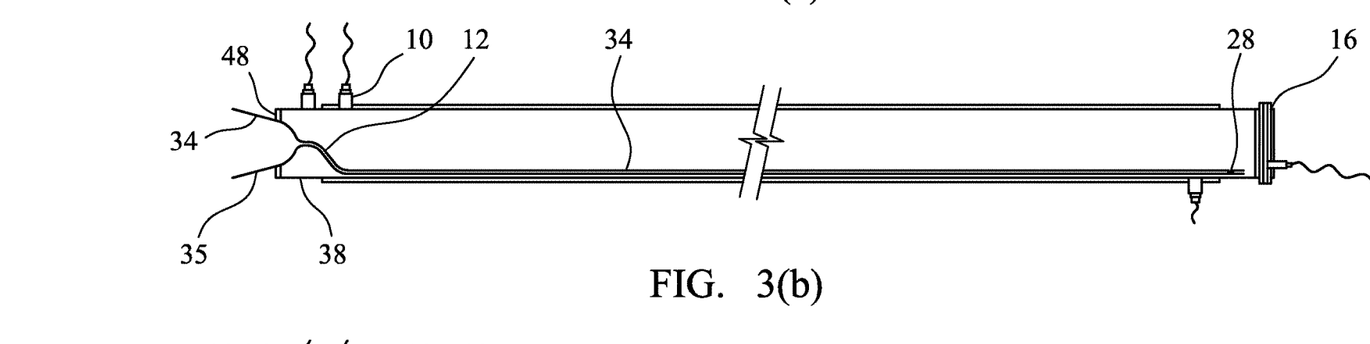
Figure 3C:
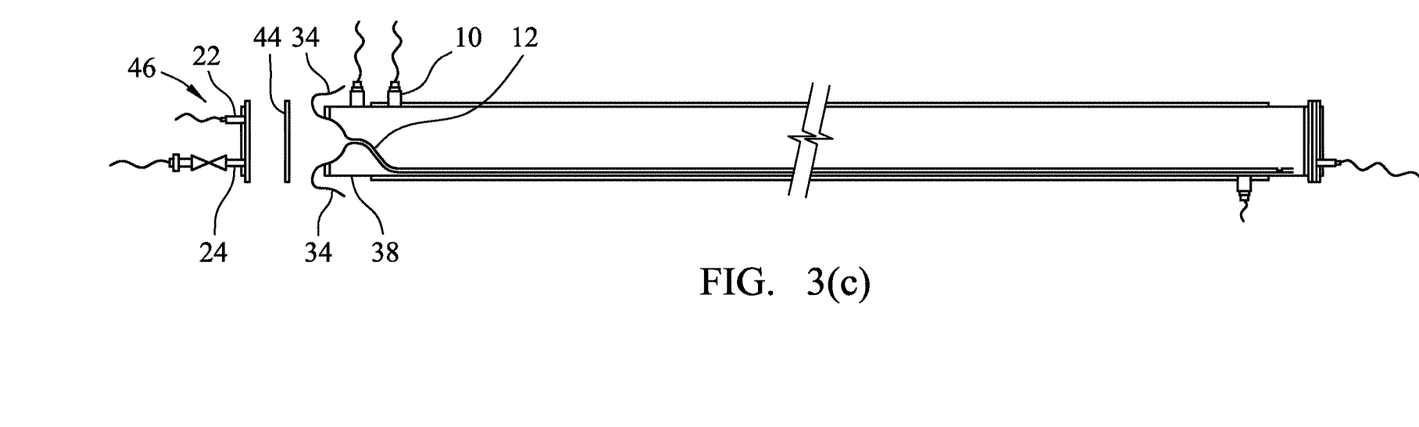
Figures 3D, 4A:
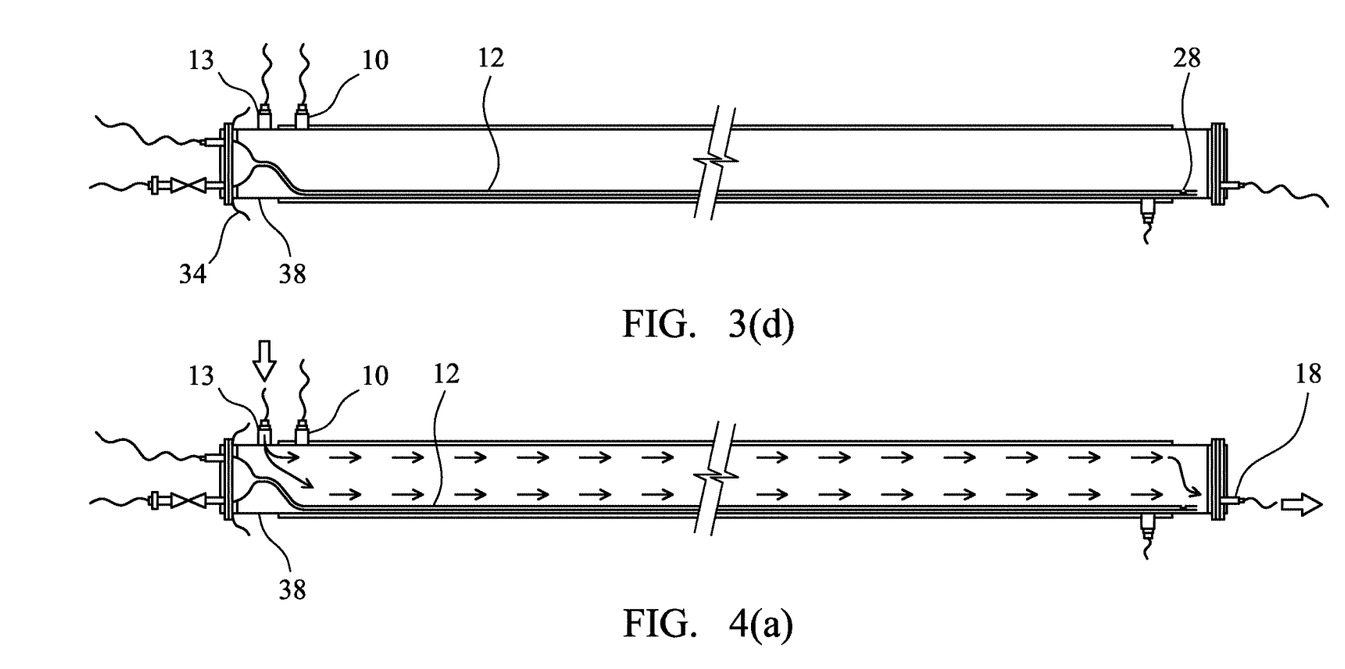
FIGS. 4(a) and 4(b) illustrate steps involved in readying the assembled apparatus of FIG. 3(d) for use in a polymerisation process.

The reaction tube 12, produced from tube 26 as described in FIG. 2(d), is inserted into the inner tube 38 and pushed thereinto so its heat sealed end 28 is adjacent end fitting 16. As shown in FIG. 3(b), initially the splayed open end 35 protrudes from the inner tube 38. Next, as shown in FIG. 3(c), the splayed open end 35 is turned back over flange 48 produced on inner tube 38. Then, as represented in FIG. 3(d), gasket 44 and end plate 46 are secured in position thereby firmly (and sealingly) clamping the open end 35 in position as represented in FIG. 3(d). Note in FIG. 3(d) sanitary fitting clamps have been omitted in the interests of clarity.

As will be noted from FIG. 3(d) after insertion of tube 12 (and prior to inflation thereof) the tube is flaccid as represented in FIG. 3(d).

After assembly of the apparatus as described with reference to FIGS. 3(a) to 3(d), the apparatus may be readied for use, as described with reference to FIGS. 4(a) and 4(b), by inflating the tube 12 and inerting any region of the apparatus which may contact monomer/catalyst subsequently introduced into the apparatus, including indirect contact occurring via gas diffusion through the tube.

Referring to FIG. 4(a), initially the volume within the apparatus outside the tube 12 and within the inner tube 38 is inerted to a specified level (e.g. less than 0.3% vol oxygen by introduction of inert gas (e.g. nitrogen) via port inlet 13 as represented by arrows in FIG. 4(a). The inert gas exits via port 18. The oxygen content of gas exiting the inner tube 38 may be monitored at a downstream sampling point (not shown) using standard methods.

Figure 4B:
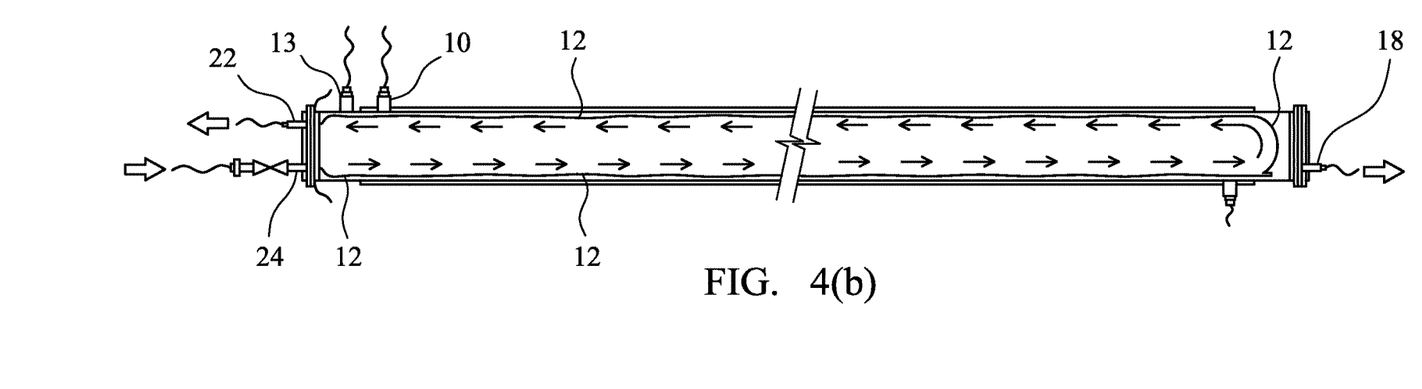

Next, the tube 12 is inflated as shown in FIG. 4(b), using an inert gas (for example nitrogen). Inert gas is passed through the tube until the inert gas exiting via port 22 has an oxygen content (e.g. of less than 0.3% vol), measured at a downstream sampling point (not shown). Inflation involves introduction of the inert gas via port 24 into the tube 12.

The gas circulates within the tube 12 to inflate it and exits via port 22. During inflation of tube 12, inert gas supply via port 13 is stopped. Inflation of tube 12 can be verified by observing gas flow from port 18, resulting from displacement of a gas volume from outside tube 12 due to inflation of the tube 12. Once inflation of the tube 12 has been completed as shown in FIG. 4(b), port 18 is temporarily closed off, while inerting of tube 12 is completed, to prevent air ingress via port 18. Port 18 is reopened prior to charging of monomer(s)/catalyst(s) to the apparatus.

As an alternative to the sequence of steps described with reference to FIGS. 4(a) and 4(b), the sequence of steps may be interchanged—e.g. the tube 12 may be inflated first and then sealed before inerting the region outside tube 12. Alternatively, the steps of FIGS. 4(a) and 4(b) could be undertaken substantially simultaneously, with a slightly higher gas pressure within tube 12 to keep it in an inflated condition.

Figure 5:
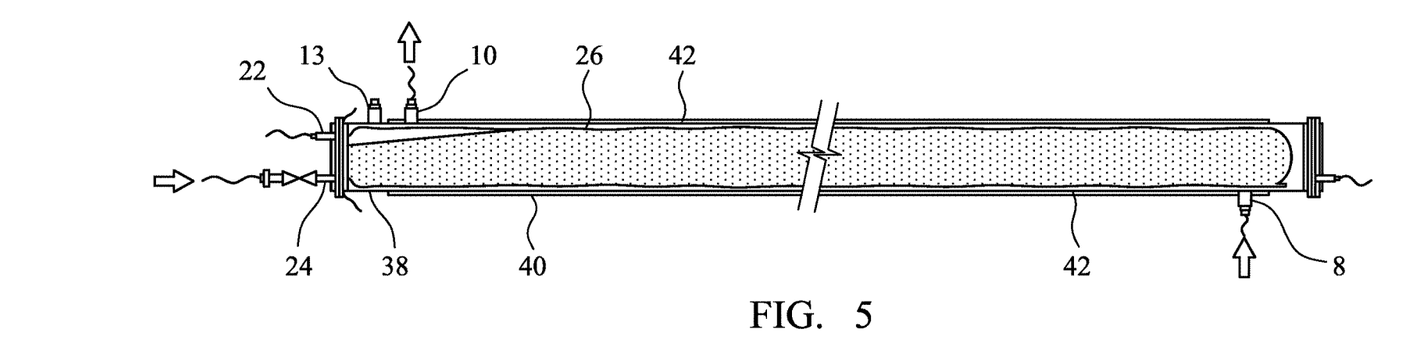
FIG. 5 illustrates the apparatus being charged for bulk polymerisation.
Figure 10A:
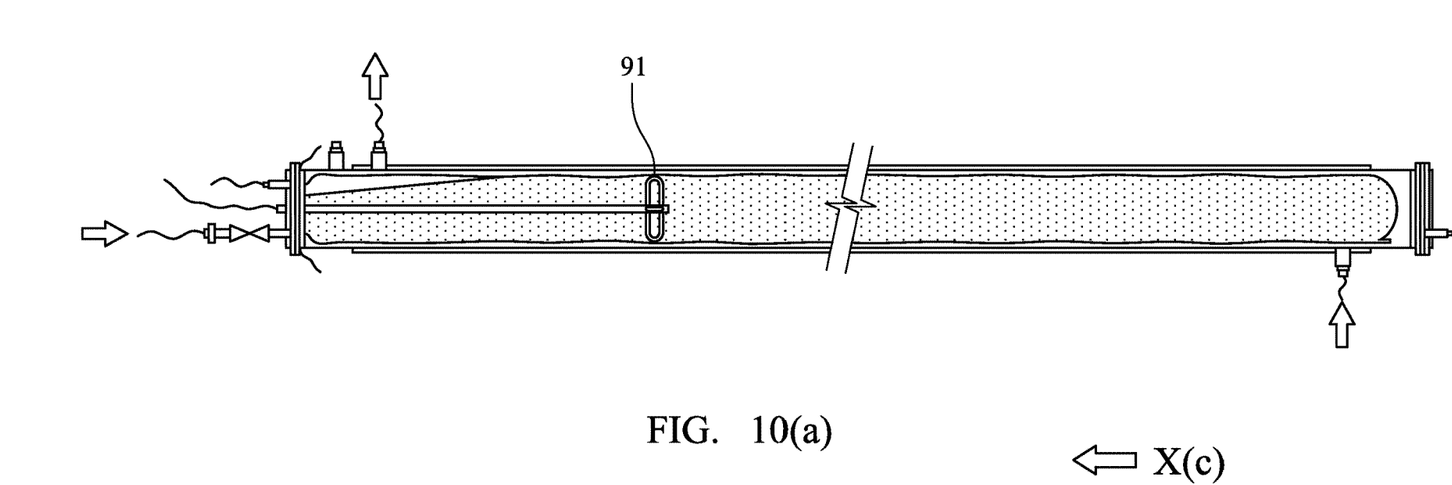
FIG. 10(a) is a representation of the apparatus of FIG. 1, but additionally including a thermocouple for monitoring temperature during the polymerisation process.
Figure 10B:
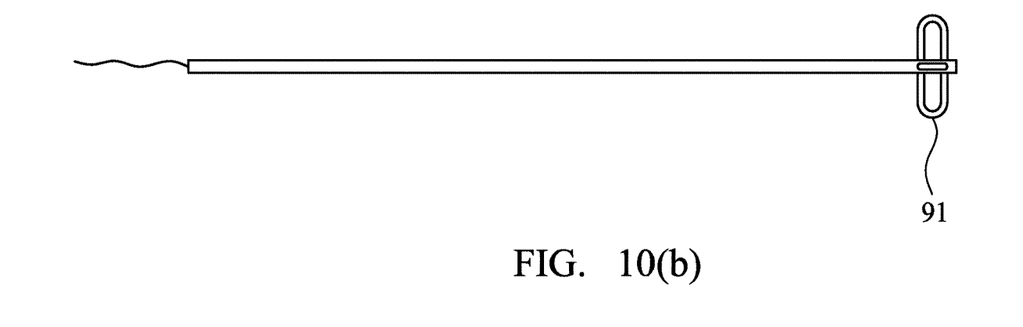
FIG. 10(b) is a representation of the thermocouple in side elevation.
Figure 10C:
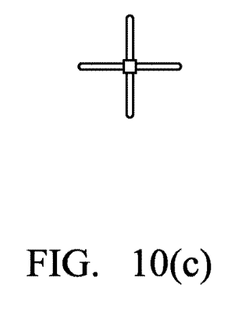
FIG. 10(c) is an end view in the direction of arrow X(c) of FIG. 10(b)

After completion of step 4(b), the apparatus is ready to be charged with reagents and polymerisation undertaken. Referring to FIG. 5, the flow of coolant in the passageway 42 between tubes 38, 40 is progressed by introducing coolant thereinto via inlet 8 and removing coolant therefrom via outlet 10. Next, a monomer/catalyst mixture is introduced into the inflated tube 12 via port 24 thereby to fill tube 12. The polymerisation reaction is then allowed to proceed for an appropriate length of time (typically about 6 days). During this time, coolant is flowed continuously and temperature may be monitored. For example, some apparatus may include a suitably positioned thermocouple 91 (FIG. 10). In addition, a relatively low pressure (approx. 0.5 psi) of inert gas is applied via ports 22 and 13 to ensure the tube 12 (and its polymerising contents) is maintained under an inert atmosphere.

The monomer(s)/catalyst(s) mixture is suitably arranged to produce an ultra-high molecular weight polymer for use in drag reduction. The polymer may suitably be a polymer and/or copolymer of alpha-olefin(s).

Using the apparatus, polymer was prepared from 1-decene monomer, as described in Example 1.

Example 1—Production of Polymer 1-decene monomer (31.6 kg) was purged with nitrogen for 60 minutes to remove dissolved oxygen which would otherwise be poisonous to the catalyst used. The monomer was passed through a pre-treatment column containing 1.5 kg of a 50:50 mixture of 13X and 5 Å molecular sieves (which had been pre-dried under vacuum at high temperature). Post the pre-treatment column, the monomer was pumped to a 90 litres stirred and jacketed glass lined reactor which had previously been dried and inerted to 0.3 vol % oxygen or lower.

The 1-decene was cooled to 5° C. and then 25 wt % diethylaluminium chloride (DEAC) (80.45 g) in heptane was transferred to a Swagelok (Trade Mark) bomb within a glove box. This was then added to the 1-decene under an inert atmosphere to scavenge any residual water or protic impurities. The mixture was then stirred for 20-30 minutes in a 90 litres reactor.

Inside a glovebox, titanium trichloride aluminium activated $TiCl_3(AAD)$ (3.7888 g), was dispersed with stirring into anhydrous heptane (157.6 ml), anhydrous 1,2-dichloroethane (1.37 ml) and isobutylaluminoxane (IBAO) in heptane (3.5 wt % aluminium content in heptane) (41.4 ml) was added to the catalyst dispersion. The mixture was stirred, then transferred to a Swagelok bomb and subsequently transferred to the 90 litres reactor, whilst maintaining an inert atmosphere, to initiate the Ziegler Natta polymerisation.

It is found that, on mixing of monomer and catalyst, polymerisation is instantly initiated and thus proceeds rapidly. The mixture was then rapidly introduced using inert gas pressure to the inflated tube 12 via port 24 as described above with reference to FIG. 5.

The reaction mixture was held within tube 12, as shown in FIG. 5, at a jacket temperature of 5° C. Chilled water was flowed in passageway 42. After 24 hours, the temperature of fluid in passageway 42 was increased and the reaction continued.

During the entire process, both the outside and inside of tube 12 were kept under approximately 0.5 psi nitrogen pressure by introducing nitrogen via ports 13 and 22 to assist in restricting oxygen ingress into the polymerising mixture.

Figure 6:
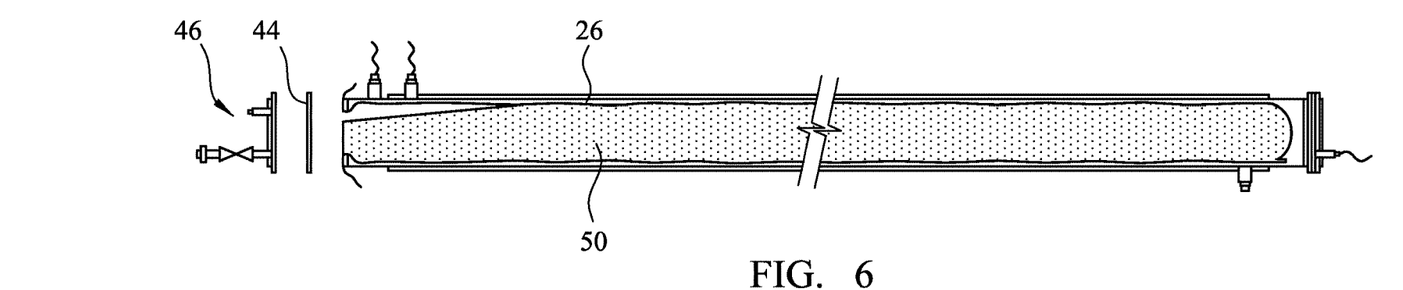
FIGS. 6 and 7 show steps in the removal of the plastic reaction tube from other parts of the apparatus.
Figure 7:
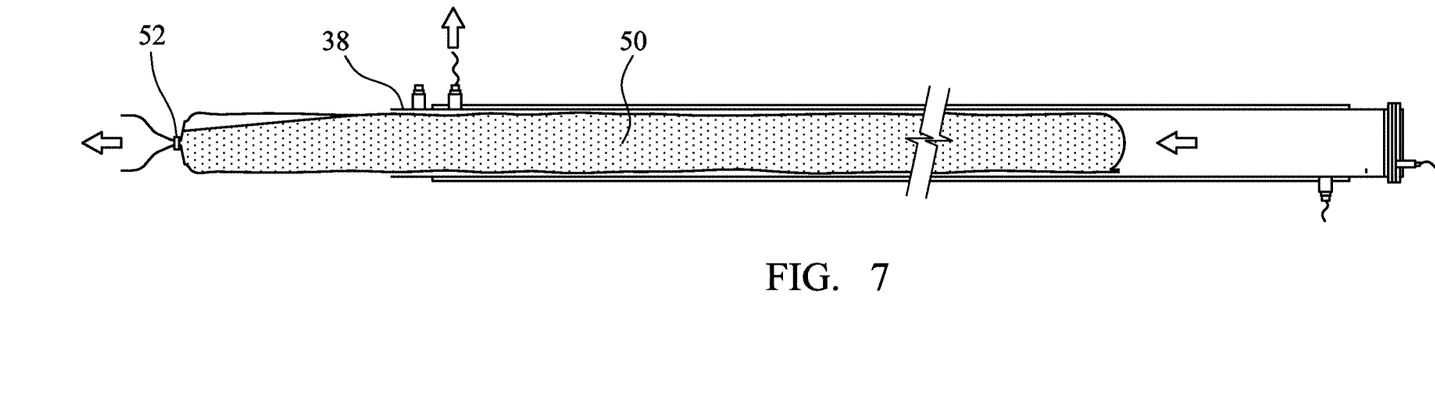
Figure 8:
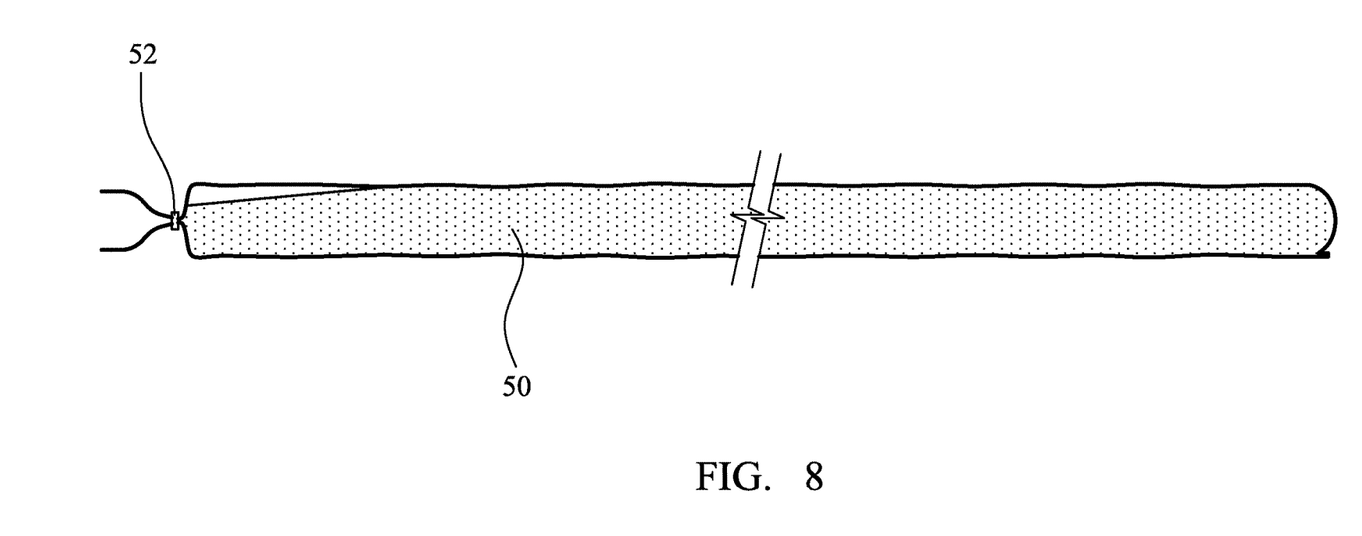
FIG. 8 shows a sealed tube containing polymer.

At the end of the aforementioned 6 days reaction time, gasket 44 and end plate 46 were disengaged as shown in FIG. 6, to provide access to the tube 12 which contained polymer 50. End plate 16 may optionally also be removed to allow visual inspection of polymer in the tube 12. The tube 12 (and polymer) were then manually withdrawn from inner tube 38, as shown in FIG. 7. During the withdrawal, the open end of tube 26 was closed by a tightly drawn cable tie 52 (or the like). Subsequently, the tube was fully removed to isolate the sealed tube 12 containing an approximately 20 feet (610 cm) log of polymer 50 as shown in FIG. 8.

Figure 9:
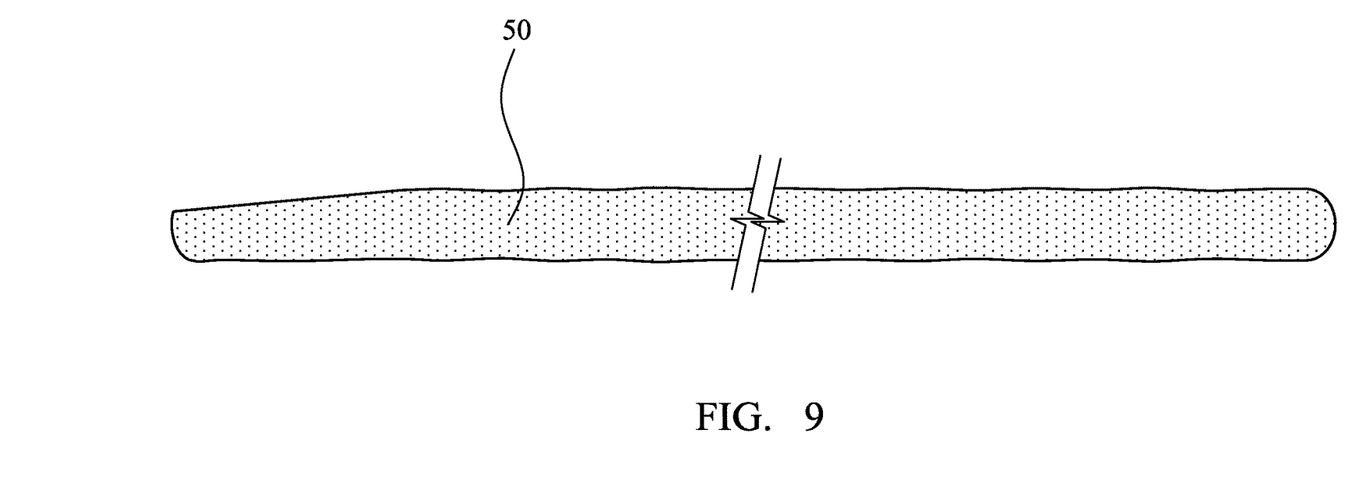
FIG. 9 shows a log of polymer removed from the reaction tube.

The tube 12 (which is made from polyethylene as described) can readily be detached, for example cut and/or peeled away from the log of polymer 50, to thereby produce an isolated log 50 of polymer, as a single piece, as shown in FIG. 9. Substantially no PE residue contaminates the polymer after removal of tube 12 which may minimise contamination of the polymer, and in turn, may be advantageous in downstream uses thereof. Whilst not wishing to be bound by any theory, the ease with which the tube can be cut away from polymer 50 may be related to the fact the polymer has a higher bulk density (approximately 0.85 g/cm$^3$) than the 1-decene (density 0.74 g/cm$^3$) starting material which means the polymer tends to shrink away from the wall of the receptacle as it is formed.

The log of polymer 50 of FIG. 9 may be processed, by known methods and contacted with a carrier to produce a formulation comprising a DRA.

Other procedures undertaken are described in Examples 2 to 7. Examples 2 to 6 describe procedures for assessing characteristics of polymers produced as described herein and results of such assessments.

Example 2—Determination of Polymer Conversion Percentage in a Polymer Produced

A disposable aluminium dish was weighed to four decimal places and the weight recorded (A). A sample of the test material (2-3 g) was placed in the dish and the combined weight of the dish and sample also weighed to four decimal places (B). The sample was dried in a vacuum oven (200° C., 0.04 Torr) for one hour, removed and reweighed. This process was repeated until constant weight (C) was achieved.

The polymer conversion percentage was calculated as follows:

$$\% \text{ conversion} = (C-A)/((B-A)*D)$$

where D is equivalent to the percentage purity of the commercial alpha-olefin monomer used/100. For example, D=0.994 for commercial 1-decene of purity 99.4%.

Example 3—Determination of Percentage Drag Reduction of Polymer Produced

Step 1—Preparation of Working Solution n-Hexane (~80 mL) was charged to a 250 mL bottle. A piece of the test polymer was sampled directly from the polymer log, as prepared in the bulk polymerisation reaction and accurately weighed to four decimal places (0.0150-0.0200 g). The polymer was then dissolved in the n-hexane by mixing for 2 days under low shear conditions, to provide a solution (A).

Solution (A) was then transferred to a clean, preweighed 500 mL bottle and accurately topped up with further n-hexane to provide a final polymer concentration of 100 mg/kg (100 ppm w/w). The sample was manually mixed, avoiding vigorous shaking, providing partially diluted solution (B).

An aliquot of solution (B) (4 g) was accurately weighed into a clean, preweighed 1000 mL bottle, then accurately topped up with further n-hexane to the target sample weight (400 g). The sample was manually mixed as above to provide working solution (C) 1 mg/kg (1 ppm w/w).

Step 2—Drag Reduction Testing Procedure

Clean, preweighed collection bottles (1000 mL) were used for collection of liquids during the test runs.

The test apparatus consisted of a 2 litre pressure vessel, fitted with charging inlet for solvent, bottom run off (used for cleaning purposes at the end of experiments), and a dip leg connected to a length of stainless steel tubing external to the vessel (7 feet length, 6.35 mm OD, 0.89 mm wall thickness). The tubing was fitted with a control valve at the outlet. The pressure vessel was further fitted with an inert gas inlet, connected to a supply line via a precision pressure control valve. This was set at a constant pressure (2.6 psi) for all experiments.

The vessel was charged with ~400 g of either working solution (C) as prepared in Step 1, or untreated n-hexane (control sample), then sealed and pressurised with inert gas (2.6 psi) with the outlet control valve closed. This valve was then opened allowing liquid to purge the external tubing, then closed (this liquid was discarded). A preweighed collection bottle (1000 mL) was placed at the outlet, then the valve reopened for 12-13 seconds to allow the liquid to flow again, recording the elapsed time using a stopwatch. The remaining liquid in the vessel was then discarded, rinsing the vessel thoroughly with untreated n-hexane (for test cycles where solution (C) was used).

The percentage flow improvement (% FI) and percentage drag reduction (% DR) were calculated from the hexane blank flow rate (F0) and the treated sample (solution (C)) flow rate (Fa) as follows:

$F0$ in g/sec=(collected weight in g)/(time valve was opened in seconds)

$Fa$ in g/sec=(collected weight in g)/(time valve was opened in seconds)

then

% FI=100*$(Fa-F0)/F0$

% DR=$[(1+\% \text{ FI})^{1.9}-1]/(1+\% \text{ FI})^{1.9}$

Examples 4 to 6—Production of Polymers Using Different Catalyst Amounts

Three separate bulk polymerisation reactions (Examples 4 to 6 respectively) were carried out using the apparatus described above, with 1-decene as the monomer. The synthesis procedure was identical to that described in Example 1 other than modification of the charges of $TiCl_3(AAD)$, 1,2-dichloroethane, isobutylaluminoxane solution and heptane diluent, to provide different levels of catalyst loading (expressed as ppm w/w of Ti relative to the monomer charge weight). After completion of the bulk polymerisation the reaction tube comprising the polymer was removed according to the procedure above, and the polymer sampled for analysis, as described in Examples 2 and 3.

For each of the polymer products, polymer conversion percentages were determined for 10 samples, taken from different points within the polymer log. These points were selected to provide information on the consistency of polymerisation along both the long axis and the cross sectional diameter of the polymer log.

For each of the polymer products, percentage drag reduction (% DR) was determined as described in Example 3 for four samples taken from different points within the polymer log. These points were selected to provide information on the consistency of product performance characteristics along the long axis of the polymer log.

The results of these experiments are shown in Table 1.

TABLE 1

| Example No. | Catalyst (ppm w/w Ti) | % polymer conversion | | % drag reduction | |
|---|---|---|---|---|---|
| | | Average | Standard deviation | Average | Standard deviation |
| 4 | 120 | 87 | 1 | 50.49 | 1.61 |
| 5 | 100 | 87 | 1 | 49.60 | 0.81 |
| 6 | 80 | 83 | 1 | 51.62 | 0.68 |

The results show that, when bulk polymerisations were carried out using the apparatus described, products with excellent performance characteristics were obtained. The data shows that polymerisation could be successfully achieved using the apparatus, across a range of catalyst concentrations typical for this application. Furthermore, for each individual experiment the data showed excellent consistency in both chemical composition and performance characteristics, throughout the polymerised reaction volume.

Examples 7 to 9—Production of Copolymers

Three separate bulk polymerisation reactions (Examples 7 to 9 respectively) were carried out using the apparatus described above, with a monomer mixture of 1-hexene and 1-decene. The synthesis procedure was identical to that described in Example 1 (120 ppm w/w of Ti relative to the monomer gauge weight) other than the selection of monomers. After completion of the bulk polymerisation the reaction tube 12 comprising the polymer was removed according to the procedure above, and the polymer sampled for analysis, as described in Examples 2 and 3.

Polymer conversion percentages and percentage drag reduction (% DR) measurements, from multiple points within the polymer log, were taken and reported in identical manner to Examples 4 to 6.

The results of these experiments are shown in Table 2.

TABLE 2

| Example No. | 1-hexene | | 1-decene | | % polymer conversion | | % drag reduction | |
|---|---|---|---|---|---|---|---|---|
| | wt % | mol % | wt % | mol % | Average | Standard deviation | Average | Standard deviation |
| 7 | 60.0 | 71.4 | 40.0 | 28.6 | 87 | 1 | 51.92 | 0.67 |
| 8 | 35.7 | 48.0 | 64.3 | 52.0 | 88 | 3 | 50.90 | 0.68 |
| 9 | 28.6 | 40.0 | 71.4 | 60.0 | 89 | 3 | 51.66 | 0.35 |

The results show that, when bulk polymerisations were carried out using the apparatus described to make copolymers, products with excellent performance characteristics were also obtained. Similarly to Examples 4 to 6, the data showed excellent consistency in both chemical composition and performance characteristics, throughout the polymerised reaction volume.

Figure 11:
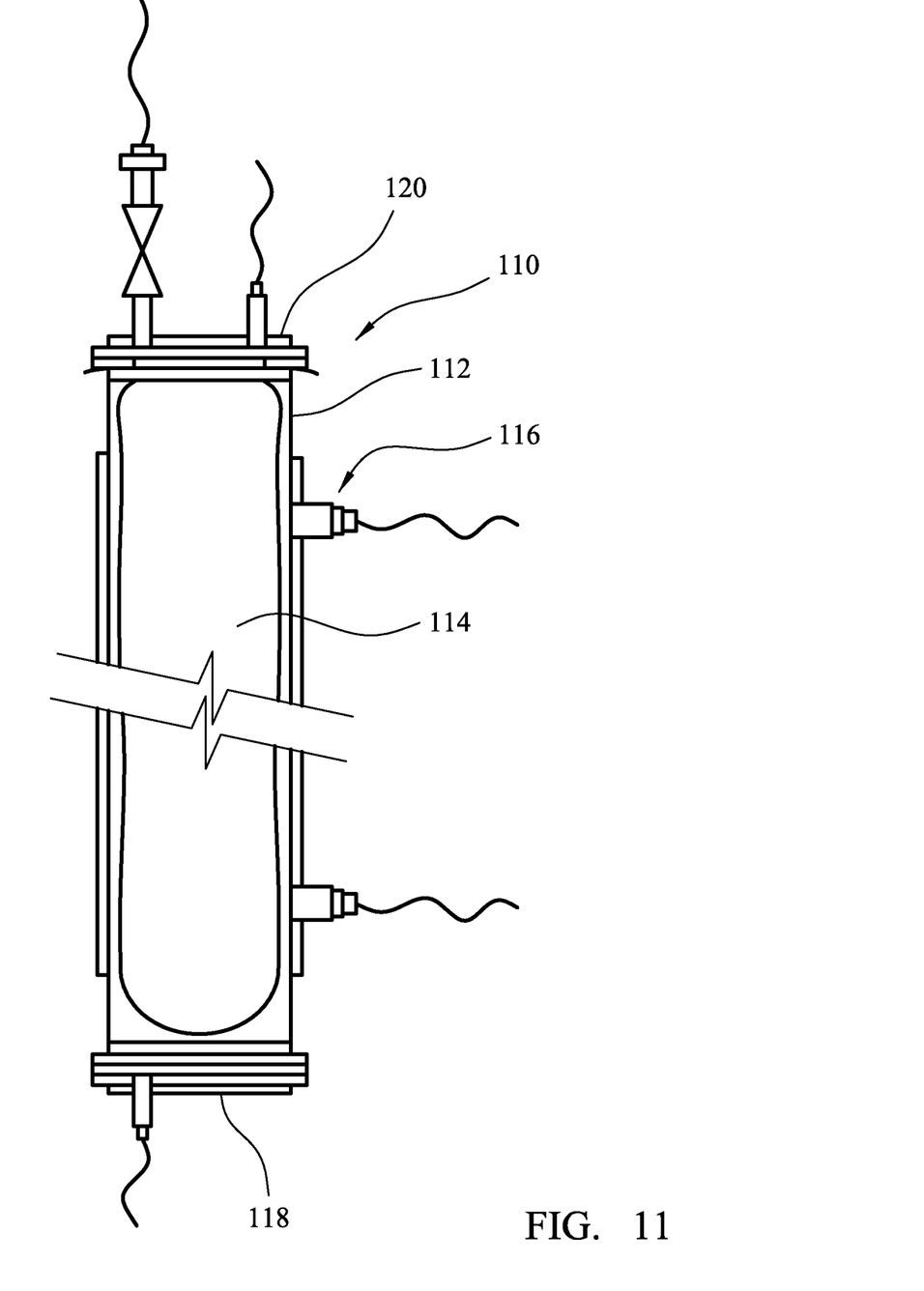
FIG. 11 is a schematic diagram of a simplified apparatus for producing a polymer.

An alternative, simplified, apparatus 110 is shown in FIG. 11. The apparatus 110 for undertaking a chemical reaction comprises an elongate housing 112 and a receptacle 114. The elongate housing 112 includes a cooling means 116 and end fittings 118, 120 which include ports via which fluids may be introduced and/or removed. In use of the apparatus 110, a chemical reaction product is formed within the receptacle 114. Subsequently, the receptacle 114 containing the chemical reaction product is withdrawn from the elongate housing 112.

Although only one apparatus 2, 110 has been described, an assembly may be provided including multiple apparatuses 2, 110 to manufacture larger amounts of polymer. Such reactors could be filled sequentially or simultaneously, optionally through the use of a manifold system.

In another embodiment, apparatus for carrying out a polymerisation reaction may comprise multiple assemblies, each comprising a reaction tube 2 within a rigid tube 38. The assemblies may collectively be surrounded by a single cooling jacket which is arranged to cool all of the reaction tubes concurrently. For example, two or more assemblies, each comprising a reaction tube 2 within a rigid tube 38, may be axially aligned and a single cooling jacket may envelope the tubes. In an alternative, a plurality of assemblies, each comprising a reaction tube 2 within a rigid tube 38, may be in a stacked arrangement, with a single cooling means being arranged to cool the plurality.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A combination comprising an elongate receptacle containing a drag reducing polymer, wherein the receptacle defines an internal volume which contains said polymer, wherein the diameter of the internal volume is at least 5 cm, wherein said internal volume is in the range 10000 $cm^3$ to 150000 $cm^3$ and contains a solid mass of drag reducing polymer, wherein the aspect ratio of the elongate receptacle defined as the length of the internal volume of the receptacle divided by the diameter of the internal volume of the receptacle is at least 20, wherein the solid mass is substantially elongate and has a volume in the range 10000 $cm^3$ to 150000 $cm^3$, wherein said receptacle includes a first end and a second end which are spaced apart along the elongate extent of the receptacle, wherein said first end is a closed end and said second end is not heat sealed to restrict access to the receptacle at said second end, wherein said drag reducing polymer is selected from the group comprising poly(alpha-olefin), polychloroprene, vinyl acetate polymers and copolymers, poly(alkylene oxide)(PAO), and mixtures thereof.

2. The combination according to claim 1, wherein said receptacle is not self-supporting.

3. The combination according to claim 1, wherein said receptacle comprises a plastic material which comprises an unsubstituted polyolefin polymer.

4. The combination according to claim 1, wherein said first end includes a sealed region whereby opposing walls of the receptacle are secured together to seal said first end against passage of said drag reducing polymer out of the receptacle via said first end.

5. The combination according to claim 1, wherein the length of the receptacle is the linear distance between said first end and said second end, wherein the diameter of the receptacle is substantially constant for at least 80% of the distance from the first end towards said second end.

6. The combination according to claim 5, wherein a region of the receptacle adjacent said second end diverges so an opening of the receptacle at said second end has a greater diameter than a region of the receptacle inwards of the second end.

7. The combination according to claim 1, wherein said second end is not provided with any permanent closure.

8. The combination according to claim 1, wherein said second end diverges and the maximum diameter of the divergent region is up to 30% greater than the diameter of the receptacle upstream of the divergent region.

9. The combination according to claim 1, wherein said receptacle is formed from lay-flat tubing which is sealed at a first end and is divergent at a second end.

10. The combination according to claim 1, wherein said receptacle comprises a plastic material.

11. The combination according to claim 10, wherein the aspect ratio of the receptacle is defined as the length of the internal volume of the receptacle divided by the diameter of the internal volume of the receptacle, wherein said aspect ratio is at least 30 and said aspect ratio is less than 600.

12. The combination according to claim 11, wherein the weight of drag reducing polymer in said receptacle is at least 15 kg.

13. The combination according to claim 1, wherein said receptacle comprises a plastic film material which has a thickness of at least 20 µm and a thickness of less than 2000 µm.

14. The combination according to claim 13, wherein the receptacle does not comprise a laminate and/or a multi-ply material.

15. The combination according to claim 13, wherein substantially the entirety of said receptacle comprises a plastic material.

16. The combination according to claim 1, wherein the diameter of the internal volume of the receptacle is in the range 5 cm to 15 cm across its entire extent.

17. The combination according to claim 16, wherein the internal volume of the receptacle is in the range 20000 $cm^3$ to 60000 $cm^3$; and/or said length of the receptacle is in the range 3 m to 15 m.

18. The combination according to claim 17, wherein other than said first end being a closed end, the receptacle includes no seams between said first and second ends.

19. The combination according to claim 1, wherein said drag reducing polymer is a poly(alpha-olefin).

20. The combination according to claim 19, wherein the sum of the wt % of said elongate receptacle and said drag reducing polymer in said combination is at least 90 wt %.

* * * * *